US012792080B2

(12) United States Patent
Ranganathan et al.

(10) Patent No.: US 12,792,080 B2
(45) **Date of Patent: *Nov. 10, 2026**

(54) MAINTAINING THE CORRECT TIME WHEN COUNTER VALUES ARE TRANSFERRED BETWEEN CLOCK DOMAINS

(71) Applicant: Skyworks Solutions, Inc., Irvine, CA (US)

(72) Inventors: Harihara Subramanian Ranganathan, Round Rock, TX (US); Vivek Sarda, Austin, TX (US)

(73) Assignee: Skyworks Solutions, Inc., Irvine, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 18/640,549

(22) Filed: Apr. 19, 2024

(65) Prior Publication Data

US 2024/0264624 A1 Aug. 8, 2024

Related U.S. Application Data

(63) Continuation of application No. 17/987,736, filed on Nov. 15, 2022, now Pat. No. 11,994,896, which is a continuation of application No. 16/295,255, filed on Mar. 7, 2019, now Pat. No. 11,526,193.

(51) Int. Cl.
*G06F 1/10* (2006.01)
*G06F 1/06* (2006.01)

(52) U.S. Cl.
CPC . *G06F 1/06* (2013.01); *G06F 1/10* (2013.01)

(58) Field of Classification Search
None
See application file for complete search history.

(56) References Cited

U.S. PATENT DOCUMENTS

| | | | |
|---|---|---|---|
| 5,140,611 | A | 8/1992 | Jones et al. |
| 5,509,038 | A | 4/1996 | Wicki |
| 5,644,604 | A | 7/1997 | Larson |

(Continued)

FOREIGN PATENT DOCUMENTS

| | | |
|---|---|---|
| CN | 101715627 | 5/2010 |
| CN | 102281063 | 12/2011 |

(Continued)

OTHER PUBLICATIONS

82P33831, Synchronization Management Unit for IEEE 1588 and 10G/40G/100G Synchronous Ethernet, Renesas, Jul. 10, 2018.

(Continued)

*Primary Examiner* — Fahmida Rahman
(74) *Attorney, Agent, or Firm* — VIA LLP

(57) ABSTRACT

In order to reduce errors in the transfer of time from one clock domain to another clock domain, a first free running counter is incremented using a first clock signal. A free running second counter is incremented using a second clock signal, the second clock signal being asynchronous to the first clock signal. The first counter is sampled at a selected time based on a predetermined phase relationship between the first clock signal and the second clock signal to generate a sampled first counter value. The second counter is corrected based on the sampled first counter value.

20 Claims, 7 Drawing Sheets

(56) References Cited

U.S. PATENT DOCUMENTS

| | | | |
|---|---|---|---|
| 5,872,909 | A | 2/1999 | Wilner et al. |
| 5,964,880 | A | 10/1999 | Liu |
| 6,549,046 | B1 | 4/2003 | Klecka, III |
| 6,760,586 | B1 | 7/2004 | Lee |
| 6,785,851 | B1 * | 8/2004 | Franck ................ H04L 43/0847 709/224 |
| 6,839,858 | B1 | 1/2005 | James |
| 6,885,647 | B1 | 4/2005 | Chung et al. |
| 7,002,996 | B1 | 2/2006 | Dougherty et al. |
| 7,079,589 | B1 | 7/2006 | Maksimovic |
| 7,116,743 | B1 | 10/2006 | Wang |
| 7,203,227 | B1 | 4/2007 | Currivan |
| 7,272,078 | B1 * | 9/2007 | Haartsen ................... H03L 1/00 368/118 |
| 7,451,337 | B1 | 11/2008 | Hewitt |
| 7,451,339 | B2 | 11/2008 | Smith, Sr. |
| 7,535,893 | B1 | 5/2009 | Beladakere et al. |
| 7,860,205 | B1 | 12/2010 | Aweya et al. |
| 7,903,681 | B2 | 3/2011 | Roberts et al. |
| 7,987,061 | B2 * | 7/2011 | Lampe ................... G01R 23/10 702/89 |
| 8,355,476 | B2 | 1/2013 | Lee |
| 8,942,561 | B2 | 1/2015 | Boyd et al. |
| 9,246,615 | B2 | 1/2016 | Ellegard et al. |
| 9,369,270 | B1 | 6/2016 | Spijker |
| 9,426,762 | B2 | 8/2016 | Ehlers et al. |
| 9,479,182 | B1 | 10/2016 | Baidas |
| 9,594,396 | B2 | 3/2017 | Turner et al. |
| 9,628,255 | B1 | 4/2017 | Baidas |
| 9,665,121 | B2 | 5/2017 | Aweya |
| 9,860,004 | B2 | 1/2018 | Joergensen |
| 9,960,873 | B2 | 5/2018 | Yang et al. |
| 10,007,639 | B2 | 6/2018 | Mitric |
| 10,075,284 | B1 | 9/2018 | Rodrigues et al. |
| 10,084,559 | B1 | 9/2018 | Devineni |
| 10,158,444 | B1 | 12/2018 | Darras |
| 10,511,312 | B1 | 12/2019 | Pastorello et al. |
| 10,536,258 | B2 | 1/2020 | Choo et al. |
| 10,594,423 | B1 | 3/2020 | Anand et al. |
| 10,727,845 | B1 | 7/2020 | Balakrishnan |
| 10,797,686 | B1 | 10/2020 | Terstrup et al. |
| 10,917,097 | B1 | 2/2021 | Meyer et al. |
| 10,951,216 | B1 | 3/2021 | Barnette |
| 11,088,816 | B1 | 8/2021 | Sarda |
| 11,088,819 | B1 | 8/2021 | Sarda |
| 11,526,193 | B2 | 12/2022 | Ranganathan et al. |
| 2006/0020733 | A1 | 1/2006 | Sarda |
| 2006/0280182 | A1 | 12/2006 | Williams et al. |
| 2007/0046516 | A1 | 3/2007 | Dornbusch |
| 2007/0260906 | A1 | 11/2007 | Corredoura |
| 2008/0080563 | A1 | 4/2008 | Kataria |
| 2008/0240169 | A1 | 10/2008 | Cui et al. |
| 2009/0024865 | A1 | 1/2009 | Fugaro et al. |
| 2009/0168808 | A1 | 7/2009 | Cho |
| 2009/0251226 | A1 | 10/2009 | Kathuria et al. |
| 2009/0296531 | A1 * | 12/2009 | Haartsen ................... H03L 1/00 368/46 |
| 2010/0118894 | A1 | 5/2010 | Aweya et al. |
| 2011/0296226 | A1 | 12/2011 | Sorbara et al. |
| 2012/0300795 | A1 | 11/2012 | Joergensen |
| 2012/0319734 | A1 | 12/2012 | Nagaraj |
| 2013/0121347 | A1 | 5/2013 | Sarito et al. |
| 2013/0205160 | A1 | 8/2013 | Turner et al. |
| 2014/0068315 | A1 | 3/2014 | Aweya et al. |
| 2014/0320181 | A1 | 10/2014 | Mitric |
| 2015/0092797 | A1 | 4/2015 | Aweya |
| 2015/0185759 | A1 | 7/2015 | Hinderer et al. |
| 2015/0200770 | A1 | 7/2015 | Rahbar et al. |
| 2015/0207620 | A1 | 7/2015 | Colby |
| 2015/0222276 | A1 | 8/2015 | Milijevic |
| 2016/0170439 | A1 | 6/2016 | Aweya |
| 2016/0182217 | A1 | 6/2016 | Hashizume |
| 2017/0135053 | A1 | 5/2017 | Shenoi et al. |
| 2017/0288801 | A1 | 10/2017 | Aweya |
| 2017/0373824 | A1 | 12/2017 | Mitchler |
| 2019/0020333 | A1 | 1/2019 | Koch et al. |
| 2019/0036804 | A1 | 1/2019 | Mihelic et al. |
| 2019/0332322 | A1 * | 10/2019 | Kwon ................... G06F 3/0616 |
| 2019/0379474 | A1 | 12/2019 | Coulter |
| 2019/0379475 | A1 | 12/2019 | Seethamraju |
| 2020/0021379 | A1 | 1/2020 | Aweya |
| 2020/0028666 | A1 | 1/2020 | Goldin et al. |
| 2020/0050575 | A1 | 2/2020 | Mishra et al. |
| 2020/0127752 | A1 | 4/2020 | Tai et al. |
| 2020/0285265 | A1 | 9/2020 | Ranganathan |
| 2021/0297083 | A1 | 9/2021 | Nishikawa |
| 2023/0185327 | A1 | 6/2023 | Ranganathan et al. |

FOREIGN PATENT DOCUMENTS

| | | |
|---|---|---|
| CN | 102291233 | 12/2011 |
| CN | 103684727 | 3/2014 |
| CN | 104378193 | 2/2015 |
| CN | 104935332 | 9/2015 |
| CN | 107294634 | 10/2017 |
| WO | WO 2015/003364 | 1/2015 |

OTHER PUBLICATIONS

AN-12149, Implementing an IEEE 1588 V2 on i.MX RT Using PTPd, FreeRTOS, and IwIP TCP/IP stack, NXP Semiconductors (2018).

AN-1033, “Delay variation measurement and compensation”, Application Note, Renesas, Feb. 8, 2019.

AN-950, “82P338XX/9XX Usage of a SYNC Input for Clock Alignment”, Application Note, Renesas, Nov. 10, 2016.

Broadcom Corp., “Ethernet time synchronization providing native timing within the network”, White Paper, 36 pages, Oct. 2008.

Eidson, “IEEE-1588 standard for a precision clock synchronization protocol for networked measurement and control systems”, Agilent Technologies, 2005, 94 pages.

G.8273/Y.1368 (2018)—Amendment 1, Framework of phase and time clocks, ITU-T, Mar. 2020.

Gallant, “Practical implementation of a IEEE 1588 based synchronization distribution system”, Silicon Laboratories, WSTS Jun. 19, 2018, in 15 pages.

Renesas, “Synchronization management unit”, 8A34002 Datasheet, Renesas Electronics Coropration, Dec. 8, 2020, 107 pages.

Stanton, 802.1AS Tutorial, Intel Corporation, Nov. 13, 2008, 42 pages.

U.S. Appl. No. 17/375,634, filed Jul. 14, 2021, entitled “Data Protocol Over Clock Line”, by Vivek Sarda.

U.S. Appl. No. 16/836,713, filed Mar. 31, 2020, entitled “Secondary Phase Compensation Assist for PLLIO Delay Aligning Sync Signal to System Clock Signal”, by Vivek Sarda.

U.S. Appl. No. 16/836,706, filed Mar. 31, 2020, entitled “Secondary Phase Compensation Assist for PLLIO Delay”, by Vivek Sarda.

U.S. Appl. No. 16/849,036, filed Apr. 15, 2020, entitled “Phase Transport with Frequency Translation Without a PLL”, by inventor Vivek Sarda.

* cited by examiner

MAINTAINING THE CORRECT TIME WHEN COUNTER VALUES ARE TRANSFERRED BETWEEN CLOCK DOMAINS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field of the Invention

This disclosure relates to the transport of accurate time information between different clock domains.

Description of the Related Art

Network time is an important resource utilized by many applications such as location accuracy inside homes/offices, location accuracy in urban areas, and the resolution for contentions based on time in financial markets. Standards that govern the transfer and use of reference times, including but not limited to the IEEE 802.11b, IEEE 1588-2008 standards, have accuracy limits on the error introduced at each network node. The scaling of the number of nodes that use the standard in the network depends on the accuracy at which the reference time can be transferred. The reference time is usually propagated in the network over a data packet. Another clock that is asynchronous to clock generating the reference time, samples the reference time contained in the data packet. Transferring the reference time accurately through data networks utilizing asynchronous clocks is a major source of error in time transfer and limiting (or eliminating) this error is an important requirement for performance and scaling of networks.

In systems based, e.g., on IEEE 1588, a reference clocks updates time in a master counter. Referring to FIG. 1, the master clock 101 with a period ($T_m$) updates the master counter 103 every $T_m$ units of time. When the contents of the master counter 103 are sampled using another clock (slave clock) 105 having a period $T_s$ and copied into a memory element 107 every $T_s$ units of time, the "time" recorded by the slave clock 105 could have errors due to the period of the master clock and the period of the slave clock not being equal.

FIG. 2 illustrates one aspect of the problem. Assume the master counter value 201 is updated one every 8 ns ($T_m$=8 ns) by the master clock and the memory element 107 is updated every 3 ns by the slave clock 105. The memory value of memory element 107 is shown at 203 and can be seen to have a dynamic error of 3 ns.

Another source of error is due to the master clock and slave sample clock having different periods. The different periods can result in a "phase" difference between the master clock and the slave clock being a variable. The $$\text{phase difference} = (\omega_m - \omega_s) \times t + \varphi_{constant},$$

where t is absolute time, $\omega_m$ is the angular clock frequency of the master clock with a period $T_m$, $\omega_s$ is the angular clock frequency of the slave clock with a period $T_s$, and $\Phi_{constant}$ is the constant phase difference between the clocks at time t=0. The phase difference can also cause errors in the transfer of the counter value to the memory element. Referring to FIG. 3, if the master counter 103 is updated at the rising edge 301 of the master clock at time t=Tm, the counter value is copied into memory element 107 at the rising edge 303 of clock 105, at time $$t = Tm + \Delta T,$$

where ΔT is the phase difference and can be a positive or negative value. Hence, the transfer of time from a counter driven by one (master) clock source using another clock leads to errors in the copied time that arises from both the difference in the nominal periods of these clocks and the phase difference that can exist between these clocks.

SUMMARY OF EMBODIMENTS OF THE INVENTION

In order to reduce errors in the transfer of time from one clock domain to another clock domain, in an embodiment, a method includes incrementing a first counter that is free running using a first clock signal. A second counter that is free running is incremented using a second clock signal, the second clock signal being asynchronous to the first clock signal. The first counter is sampled at a selected time based on a predetermined phase relationship between the first clock signal and the second clock signal to generate a sampled first counter value. The second counter is corrected based on the sampled first counter value.

In another embodiment, an apparatus includes a first counter to increment a first counter value responsive to a first clock signal, the first clock signal having a first frequency. A second counter increments a second counter value responsive to a second clock signal that is asynchronous to the first clock signal, the second clock signal having a second frequency. A sample circuit samples the first counter value at selected times and generate a sampled first counter value at each of the selected times, the selected times occurring at a periodic predetermined phase alignment between the first clock signal and the second clock signal. The second counter value is adjusted based on the sampled first counter value.

In another embodiment a method includes generating a first counter value in a first counter using a first clock signal to increment the first counter. A second counter generates a second counter value using a second clock signal. The first counter value is sampled at a selected time to generate a sampled first counter value, the selected time occurring at a predetermined phase relationship between the first clock signal and the second clock signal that occurs periodically. An error is generated indicating a difference between the sampled first counter value and a sampled second counter value. The second counter value is adjusted according to the error by increasing or decreasing one or more increment values used to generate the second counter value to thereby remove the error in the second counter value over one or more clock periods of the second clock signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
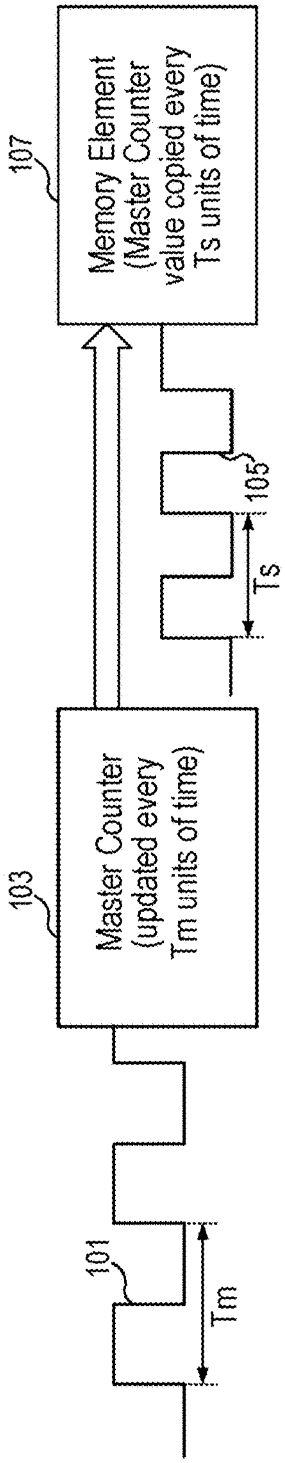
FIG. 1 illustrates a system in which a master counter is updated with a reference clock and the master counter is sampled by a different clock.

Embodiments herein address a key source of error in hardware design that limits the accuracy of the time information transmitted using various networking protocols. Embodiments exploit the properties of the reference time counter values and clocks. The time of day count values are monotonic and increase at a constant count rate set by the nominal clock period of the reference time clock. The reference time clock (also referred to herein as the master clock) and data network clock (also referred to herein as the slave clock) will periodically have a phase difference that is a multiple of 2π. If the faster of the clocks can be used to sample the slower clock, it is possible to locate that periodically occurring event. Instead of the slave clock "sampling" the master time counter value into a memory element 107 as shown in FIG. 1, embodiments implement a time counter in the slave clock domain. The master counter value is sampled when the periodically occurring event occurs. The error in the slave counter value can then be calculated by comparing the sampled master counter value to the slave counter value when the periodically occurring event occurred. That error can then be corrected by either increasing or decreasing the count increment values (adjusting the slope at which time advances) in the slave counter. Thus, slave counter can be synchronized to the reference time (or master) counter with an error bound by the period of the fastest clock in this system. For instance, a global positioning system (GPS) derived clock can be as high as 1 GHz in IEEE-1588 systems and therefore the error can be bounded to within +/−1 ns.

Figure 4:
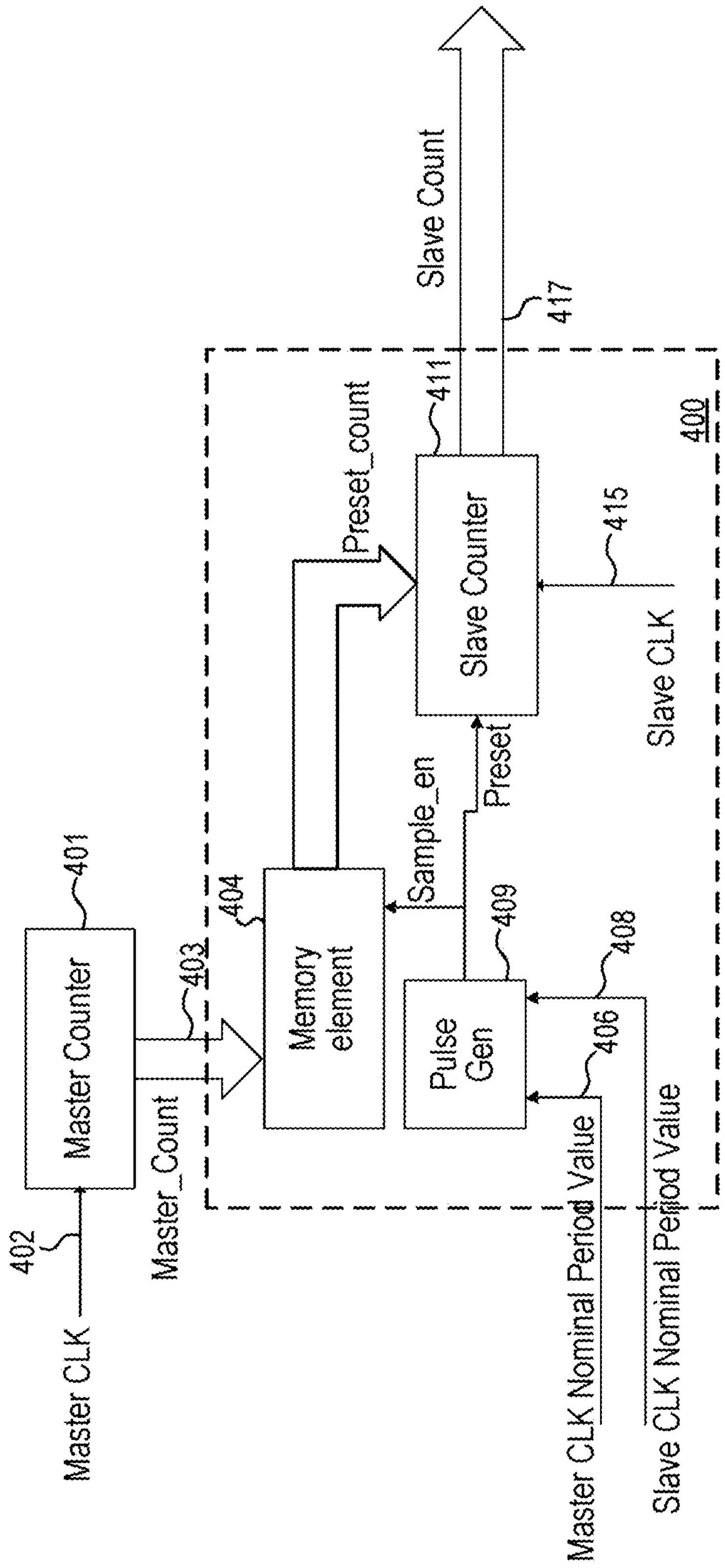
FIG. 4 illustrates a high level block diagram showing conceptually an embodiment that reduces errors in transferring time from one clock domain to another clock domain.

FIG. 4 illustrates a high level block diagram of a clock domain crossing logic block 400 illustrating conceptually an embodiment that reduces errors in transferring time from one clock domain to another clock domain. The master counter 401 is clocked by the master clock (Master CLK) 402 and supplies the master count 403 that is updated every TM units of time, where TM is the period of the master clock. The nominal period values 406 and 408 of master and slave clocks are input to a pulse generator (Pulse Gen) circuit 409. The pulse generator circuit 409 generates a signal used to identify one aspect necessary but not sufficient to identify the timing event (master and slave clocks having a phase difference that is a multiple of 2π) based on the nominal periods of the master and slave clocks. Once the timing event is pinpointed (using another calibration operation described below), the contents of the memory element 404 is used to update the slave counter 411. In embodiments, rather than directly loading the slave counter, the value of the slave counter is adjusted based on the difference between the sampled master count and the slave count at the time the master count was sampled. The slave counter 411 updates its counter value by a predefined increment once every TS units of time, where TS is the period of the slave clock 415. The slave counter 411 supplies a Slave Count output 417. Between adjustments to the value of the slave counter based on the master count, the slave counter 411 is updated each TS time increment by the slave clock.

As pointed out before there are several sources of error in sampling the master count in the slave clock domain. In order to address the error caused by the different periods of the master and slave clocks, the pulse generator generates a first calibration pulse once every K×LCM{TM, TS} where K is an integer greater than or equal to 1 and LCM{ } is a function that returns the lowest common multiple of TM and TS. Waiting K×LCM{TM, TS} units of time ensures that the nominal phase difference between the TM and TS is always the same multiple of 2π and addresses the first source of error in time transfer caused by the difference in periods of the master and slave clock. The nominal phase difference between the master clock and the slave clock repeats every K×LCM time units.

Figure 3:
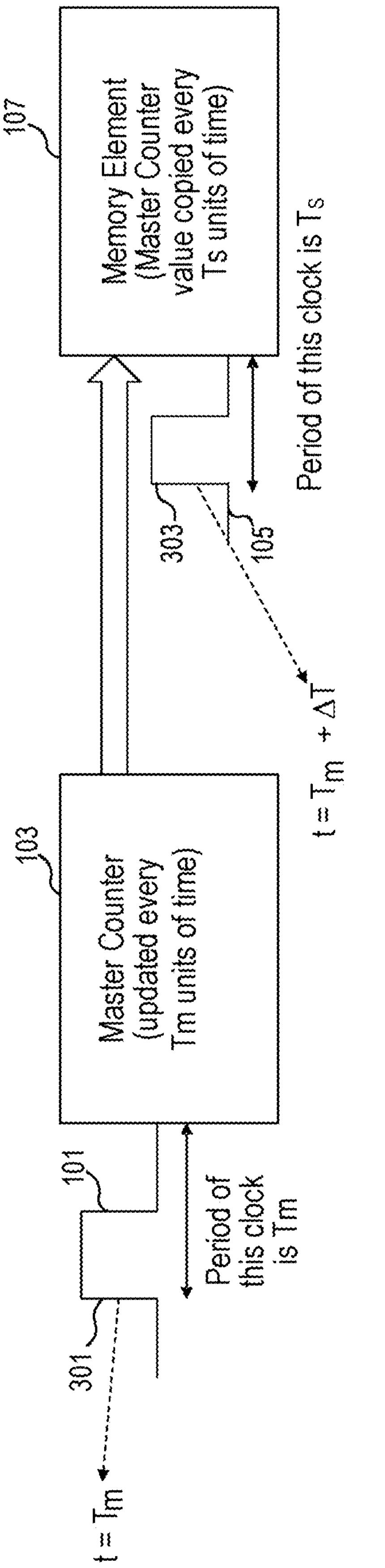
FIG. 3 illustrates another source of error associated with sampling a master timing reference based on phase difference between the master clock and the sampling clock.

The usage of K×LCM to determine the nominal phase difference is augmented through use of a second calibration routine to ensure that the master count is sampled exactly when the phase difference between the slave clock and the master clock is at the time event where the clocks have a phase difference that is a multiple of 2π, thereby eliminating errors due to a phase difference between the clocks caused by jitter in either or both clocks. Jitter present in the system can cause the edge of the master clock (or the slave clock) to lag or lead the other clock at the time the first calibration operation has completed based on K×LCM time units. Remember that one of the clocks (master or slave) is counting the time interval defined by K×LCM. Referring back to FIG. 3, the phase misalignment ΔT can result from jitter, even after using the first calibration mechanism using the nominal values of the periods of the two clocks. That phase error can result in errors in sampling the master count. Thus, a second calibration routine is performed in addition to calibrating for nominal period differences of the clocks.

The second calibration routine operates as follows: After the first calibration routine counts K×LCM time units, the master counter value, which is scaled to reflect absolute time, is compared to the TS counter value, which is scaled to reflect absolute time. The count of a clock is scaled into time as, time=nominal period×count value, where the nominal period is the scaling factor that sets absolute time. The counter values are sampled such that the sampling point accounts for possible jitter in the clock signals. That is accomplished by the faster clock looking for a particular edge of the slower clock. For example, if the slave clock is the faster clock, the slave clock samples the master clock looking for a rising edge. When the rising edge is detected, indicating that both counters reflect the same absolute time, a second calibration signal is generated that causes the master counter values and the slave counter values to be sampled and compared. The slave count is then corrected based on the difference between the sampled master and slave counter values. As explained further herein, the adjustment to the slave counter value can be made in a number or ways, including loading the slave counter with the sampled master counter value. The pulse generator issues the next pulse corresponding to the first calibration operation (K×LCM{TM, TS}) time units after the second calibration signal is generated. That second calibration operation ensures that the time transfer from the master clock domain to the slave clock domain accounts for jitter in the master and slave clock signals.

Figure 5:
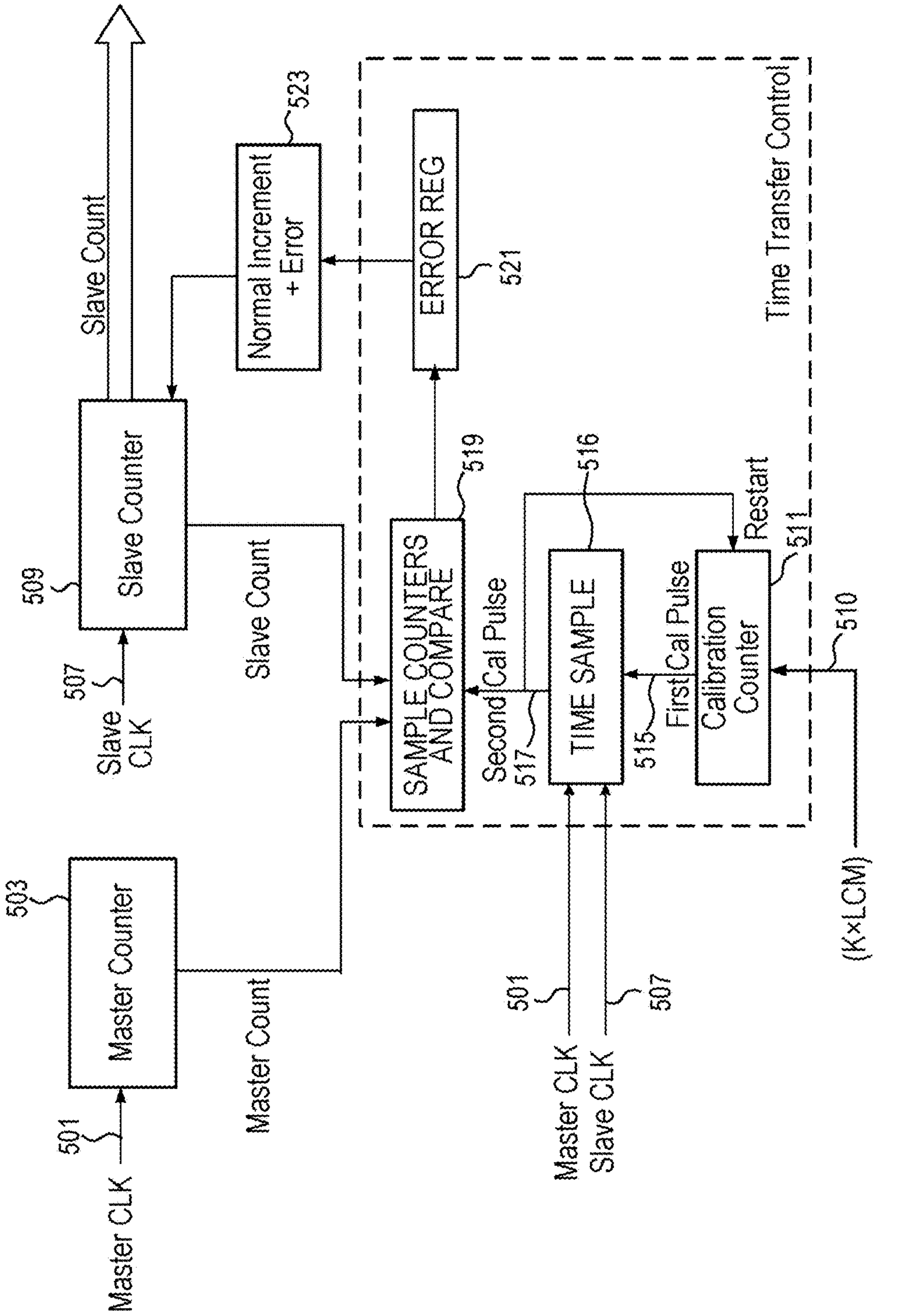
FIG. 5 illustrates some additional details of an embodiment that reduces errors in transferring time from one clock domain to another clock domain.
Figure 6:
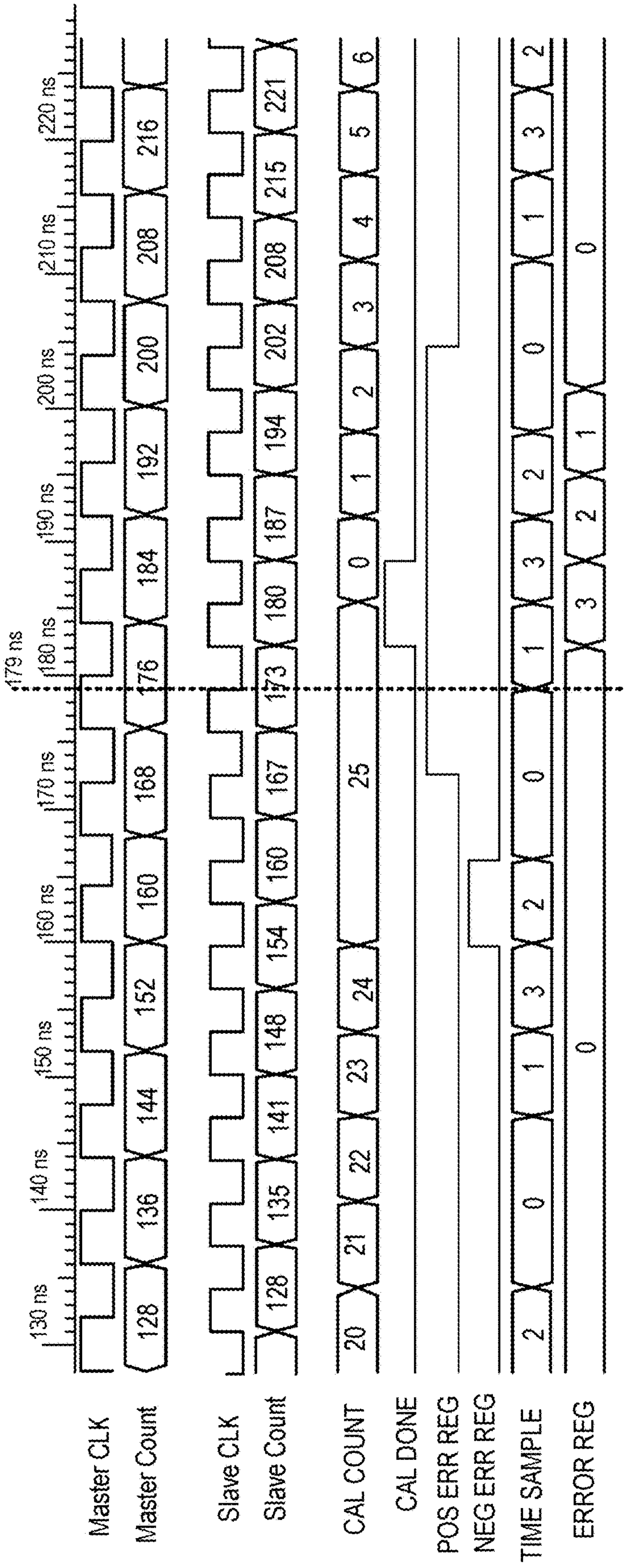
FIG. 6 illustrates a timing diagram associated with the embodiment of FIG. 5.

FIG. 5 illustrates a more detailed high level block diagram of an embodiment for transferring the master count from one clock domain to another clock domain. FIG. 6 shows a timing diagram illustrating operation of the embodiment of FIG. 5. With reference to FIGS. 5 and 6, the master clock (Master CLK) 501 clocks the master counter 503 incrementing the master counter by a predetermined increment. In the timing diagram of FIG. 6, the master clock is incrementing the master count by increments of 8 (128, 136, . . . , 216). The master clock is running at 125 MHz in the example shown (a period of 8 ns). The slave clock (Slave CLK) 507 clocks the slave counter 509 and has an average increment of 6.4 ns (an average frequency of 156.25 MHZ) in the timing diagram. Thus, the increment for the slave counter varies between 6 and 7 to achieve an average increment of 6.4 ns. Over five slave clock cycles, the slave counter uses three 6 ns increments and two 7 ns increments to achieve an average increment of 6.4 ns. That can be seen in the timing diagram of FIG. 6 where the slave count updates between 135 and 173 with an average increment of 6.4 ns. As explained above, counting K×LCM{TM, TS} time units is used as a first calibration step in determining the right time to transfer the master count to the slave count. For the embodiment illustrated in FIG. 6, LCM{8 ns, 6.4 ns}=32 ns and K=5. In FIG. 5, the calibration counter 511 counts the calibration count (CAL COUNT) K×LCM. In the embodiment shown in the timing diagram K×LCM=160 ns. The calibration counter 511 may be loaded with various values of K×LCM 510 according to the needs of the particular system. In the example timing diagram, the first calibration operation completes when the calibration counter has reached 25, which is 160 ns or 25 cycles of the slave clock in the illustrated embodiment. That is the equivalent of the first calibration pulse associated with FIG. 4. As can be seen in the timing diagram that occurs when the calibration count (CAL COUNT) goes from 24 to 25. Because the calibration counter 511 counts from 0, the $25^{th}$ 6.4 ns cycle is completed at the end of the $24^{th}$ count. The calibration counter is clocked on the negative edge of the slave clock in the illustrated embodiment. Once the calibration count reaches 25, the calibration count remains at 25 until the second calibration operation ensures that the master clock and the slave clock are lined up as desired to account for jitter in the clock signals. The calibration counter issues the first calibration pulse (First Cal Pulse) 515 to indicate the calibration count has reached K×LCM time units. The calibration counter stays at the value of 25 until the next calibration operation has identified the time to sample and compare the master count and the slave count, resulting in a transfer of time from the master clock domain to the slave clock domain.

The calibration count reaching K×LCM results in the start of the next calibration operation for the master clock and the slave clock. The faster clock, in this case the slave clock, samples the slower clock, in this case the master clock. The time sample register (TIME SAMPLE) 516 tracks the sampling of the master clock using a two bit register with the most significant bit of the two bit register representing the oldest sample. At each negative edge of the slave clock, the master clock is sampled and the value stored in the time sample register. For example, when the time sample register is a “3”, that means master clock was sampled high at each of the last two. The control logic is waiting for a 0 to 1 transition indicating the master clock has transitioned from low to high ensuring that the sampling and compare operation does not occur in the wrong half cycle. While the calibration count is at 25, the control logic samples the master clock at 179 ns resulting in sampling a high level of the master clock (with the previous sample value at 0), thereby indicating the master clock has transitioned from 0 to 1. That is the further calibration operation that is required to properly align the master clock and the slave clocks for transfer of the master count from the master clock domain to the slave clock in the slave clock domain. That results in a second calibration pulse (Second Cal Pulse) 517 that causes the master count and slave count to be sampled and compared in sample counters and compare logic 519. In the timing diagram illustrated in FIG. 6, the master count and the slave count are respectively, 176 and 173, or a positive difference of 3 at the time they are sampled and compared. The polarity of the error is reflected in the positive error register (POS ERR REG), which is part of the sample and compare logic 519 and not separately shown in FIG. 5. The calibration operation has then achieved the two calibration criteria and the calibration operation is considered done at 179 ns on the positive edge of slave clock. The calibration done (CAL DONE) signal indicates the end of the second calibration operation and the calibration counter 511 restarts counting the calibration count (CAL COUNT) from 0 on the next negative edge of the slave clock in order to determine the next occurrence of the K×LCM{TM, TS}. In other words, the calibration counter resets from 25 and starts counting on the negative edge of the slave clock (during slave count 180).

The error register (ERROR REG) 521 contains the remaining errors to be corrected in the slave counter. Initially, as can be seen at the rising edge of the slave clock after 179 ns, the error register 521 is loaded with 3 reflecting the sampled difference between the master count and the slave count. In order to reduce the difference, the increment of the slave counter is adjusted up in the normal increment plus error logic 523 if the master count is greater than the slave count (positive error) to effectively speed up the slave count and the increment of the slave counter is adjusted down if the master count is less than the slave count (negative error) to effectively slow down the slave count. In the embodiment shown in FIG. 6, the slave counter increment is increased by one between 180 and 187, by one between 187 and 194 and by one between 194 and 202 at which time the residue register goes to zero indicating the error in the slave count has been corrected for that particular K×LCM cycle. In that way the differences between the master count and the slave count are corrected every K×LCM units of time. That effectively transfers the master counter to the slave counter every K×LCM time period.

Note that in the timing diagram shown in FIG. 6, the positive error register (POS ERR REG) and the negative error register (NEG ERR REG) start sampling the errors as soon as the calibration count has reached 25 indicting a calibration operation has started. In other embodiments, the polarity of the error is tracked only at the time of the second calibration operation. In FIG. 6, the first negative edge of the slave clock that occurs after the calibration count reaches 25, samples a difference between the master count 152 and the slave count 154, or a negative error of 2. Subsequently, the next negative edge of the slave clock shows a difference of 0 (160 vs. 160). The negative edge of the slave clock after the 0 to 1 transition of the master clock shows the difference of 3 (176 vs. 173).

Note that while the error is adjusted by one LSB of the slave counter in the illustrated embodiment, other embodiments may adjust the slave counter increment by other amounts. For example, if the magnitude of the error is sufficiently high, in embodiments the increment of the slave counter is adjusted by two or more for each cycle of the slave clock. In other embodiments, error is corrected in one cycle by adjusting the slave clock increment by the magnitude of the error. Alternatively, the sampled master count can be loaded into the slave counter to achieve the adjustment.

Note that in embodiments the value K×LCM{TM, TS} may be fractional if the quantization error is acceptable. Thus, embodiments may multiply 8 ns by 6.4 ns and utilize a fractional K×LCM value as the lowest common multiple.

While FIG. 6 illustrates operation for the correction of positive errors, the operation for negative errors is identical except that the correction of the slave counter results in the increment being decreased to slow down the slave count as described above.

Figure 2:
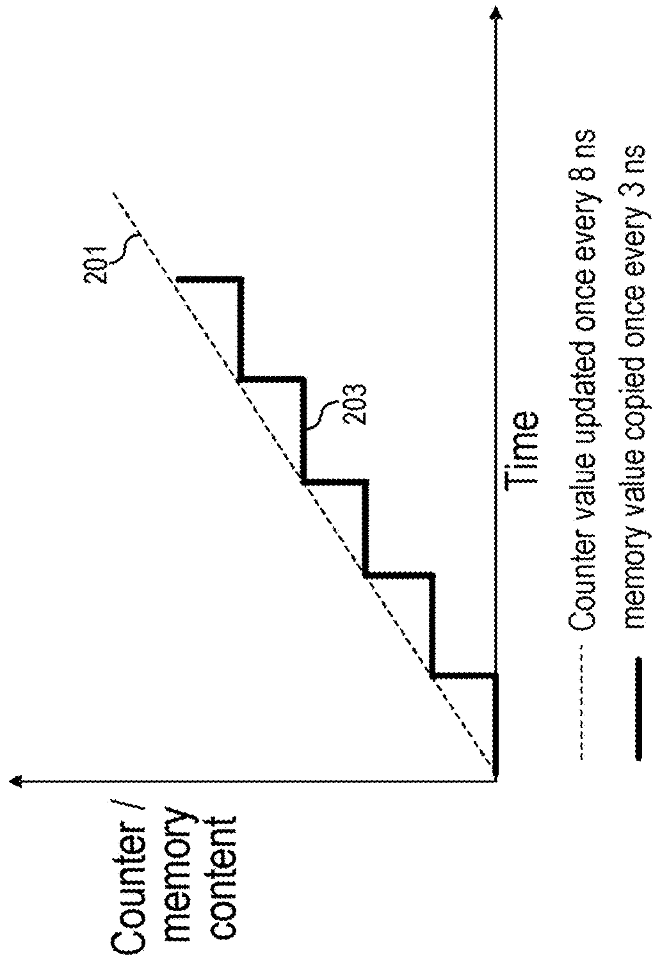
FIG. 2 illustrates the dynamic error associated with the system of FIG. 1.
Figure 7:
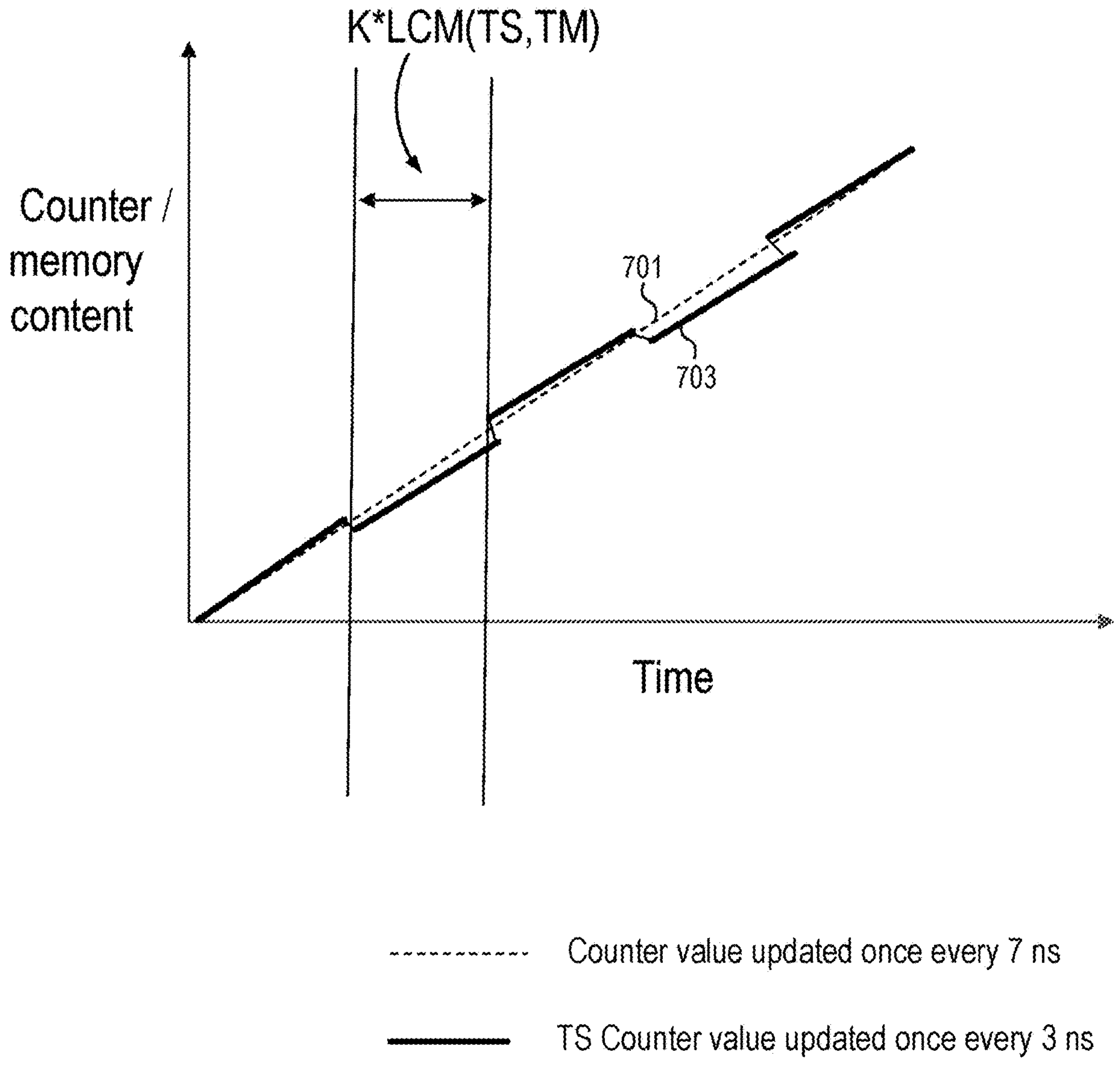
FIG. 7 illustrates graphically the solution provided by the embodiment illustrated in FIGS. 4-6.

FIG. 7 illustrates graphically the solution provided by the embodiments shown in FIGS. 4-6. Assume the master counter value 701 updates every 8 ns, i.e., $T_m$=8 ns and the slave counter value 703 updates every 3 ns. Referring back to FIG. 2, the memory element into which the master counter was copied had a dynamic error of 3 ns. The deviation (error) of the slave counter can be dramatically reduced from the period of master clock or the slave clock (whichever is smaller) to less than 1% of the slave period by running the master and slave counters concurrently and periodically correcting the slave counter based on the difference between the master counter and the slave counter. The error source is the jitter, or random noise, in the slave clock relative to the master clock. Note that the master and slave counter values 701 and 703 have slightly different slopes indicating the different rate at which time is being tracked. That difference in slopes is the error that is being corrected. Periodically, approximately every K×LCM{TS, TM} time units, the slave counter is adjusted keeping the error well below the dynamic error provided in approach of FIGS. 1 and 2.

Figure 8:
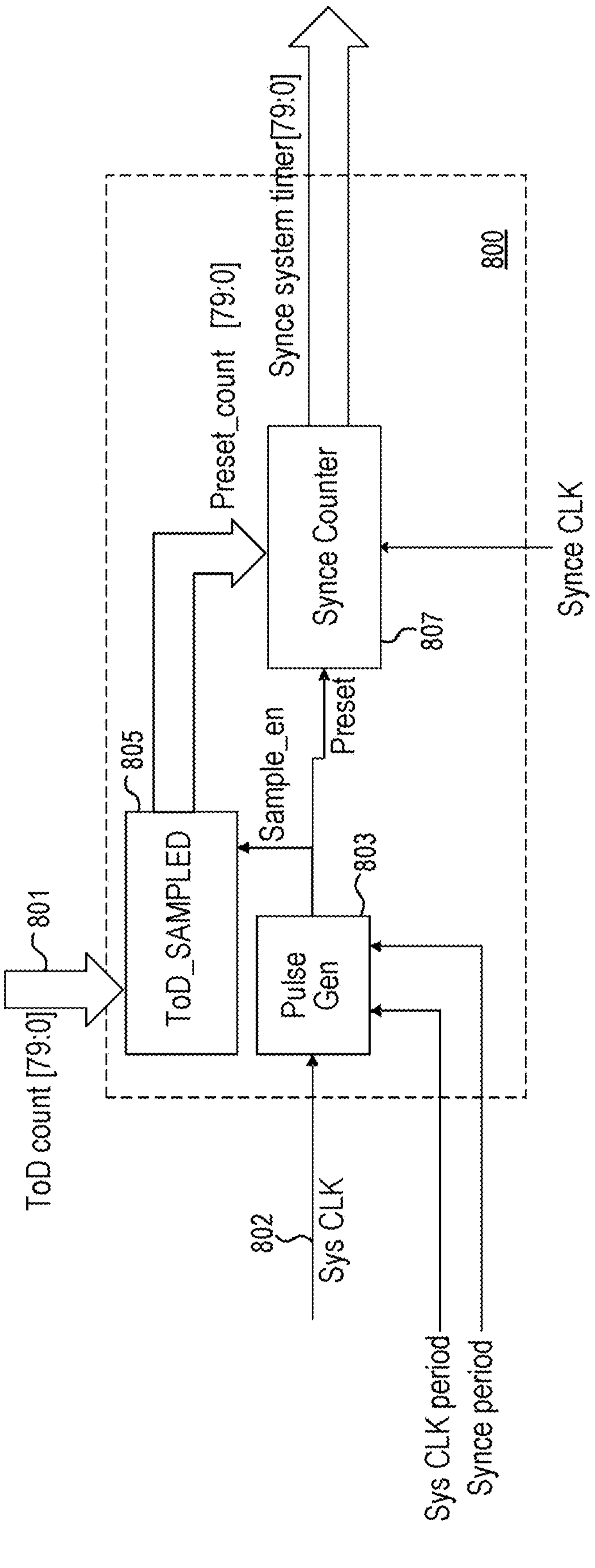
FIG. 8 illustrates a high level block diagram showing conceptually an embodiment for transferring time of day (ToD) from the master clock domain to another clock domain clocked by a Synchronous Ethernet (Synce) clock.

FIG. 8 is a high level block diagram illustrating conceptually an embodiment of a cross domain crossing block 800 that reduces errors in transferring a time of day (ToD) time value from one clock domain to another clock domain. In FIG. 8 the master count is an 80 bit ToD count 801 clocked by a system clock (SYS CLK) 802. The ToD count 801 is available as an input to the Clock Domain Crossing block 800. The pulse generator generates 803 a "high" pulse once every "N" sys clock cycles. The high pulse indicates the end of the first calibration operation. N depends on the system clock frequency (fsys) and the slave clock frequency, in this case the Synchronous Ethernet (synce) frequency (fsynce). Examples of N are shown in the table below for various clock frequencies for the system clock (fsys) and the synce clock (feth). N is determined based on K×LCM{Tfsys, Tfsynce}.

| fsys (MHz) | feth (MHz) | N |
|---|---|---|
| 125 | 156.25 | 80 |
| 250 | 156.25 | 160 |
| 500 | 156.25 | 320 |

-continued

| fsys (MHz) | feth (MHz) | N |
|---|---|---|
| 1000 | 156.25 | 640 |
| 125 | 390.625 | 32 |
| 250 | 390.625 | 64 |
| 500 | 390.625 | 128 |
| 1000 | 390.625 | 256 |

After the N system clocks resulting in the first pulse, the second calibration operation then ensures the system clock and the synce clock are aligned as desired and the sample and compare operation, described earlier, takes place. After the sample and compare operation incorporated into block 805 is complete, the synce counter 807 is adjusted based on the difference between the synce counter and the sampled ToD. The synce counter supplies an 80 bit synce system timer output.

The point in time in which the phase difference is zeroed out between the system clock and the synce clock repeats every N cycles. The time interval error (TIE) accumulated due the synce clock frequency error is limited as explained below: $TIE_{ETH}=(\Delta f_{synce}/f_{synce})$*N/fsys, where $\Delta f_{synce}$ represents the difference between the nominal fysnce value and the actual $f_{synce}$ value. assuming the max jitter in synce clock is 100 parts per million, N is 80 and fsys is 125 MHX, $TIE_{ETH\_MAX}=(\Delta f_{synce}/f_{synce})_{max}\times(N/fsys)_{max}$=100 ppm*0.64 us=64 ps. Thus, the error accumulation can be seen to be insignificant over the time period between calibration operations that occur every approximately K×LCM{ } time units. The error without using the approach shown in FIG. 8 is at least 2.5 ns and up to 8 ns. The 8 ns error occurs when the synce clock edge (156.25 MHZ) is just behind of the system clock edge (125 MHz) and therefore misses the correct time count by 8 ns (the clock period of the sys clock). The 2.5 ns error occurs in the same circumstance but when the system clock is 1 GHz and the synce clock is 390.625 MHz. Another source of error comes from the fact that synce clock and system clock are not synchronous. The synce clock period is not always a fixed number (e.g., 6.4 ns for 156.25 MHz) and that variation in period also leads to the synce clock "sampling" the wrong count values from the system clock driven time of day counter. Thus, the approach provides a 35× or even better solution than existing approaches in reducing error in time transfer between different time domains.

Thus, various aspects have been described relating to maintaining an accurate time when a reference time is transferred between two clock domains. Other variations and modifications of the embodiments disclosed herein, may be made based on the description set forth herein, without departing from the scope of the invention as set forth in the following claims.

What is claimed is:

1. A method of maintaining correct time in different clock domains comprising:

incrementing a first counter value of a first counter using a first clock signal and incrementing a second counter value of a second counter using a second clock signal, the second clock signal being slower than, and asynchronous to, the first clock signal;

determining a passage of a first time period since a previously selected time period, the first time period is a lowest common multiple of a first period associated with the first clock signal and a second period associated with the second clock signal, multiplied by K, where K is a number greater than or equal to one;

for the first time period, performing a first calibration of the first and second clock signals and loading the first counter value as the second counter value in the second counter;

determining at least one active edge of the second clock signal occurring between two active edges of the first clock signal; and for the at least one active edge of the second clock signal occurring between two active edges of the first clock signal, performing a second calibration.

2. The method of claim 1 further comprising generating a sampling pulse, and obtaining the first counter value responsive to the sampling pulse.

3. The method of claim 2 further comprising generating an error indicating a difference between the second counter value and a third counter value associated with the second counter.

4. The method of claim 3 further comprising adjusting one or more increment values over one or more cycles of the second clock signal to adjust the second counter according to the error to thereby correct the second counter.

5. The method of claim 4 further comprising increasing the one or more increment values for one or more cycles of the second clock signal.

6. The method of claim 5 further comprising decreasing the one or more increment values for one or more cycles of the second clock signal.

7. The method of claim 1 further comprising correcting the second counter value as part of the second calibration.

8. The method of claim 1 further comprising:

increasing the first counter value by a first average increment for a first number of cycles of the first clock signal; and increasing the second counter value by a second average increment for a second number of cycles of the second clock signal.

9. The method of claim 1 wherein loading the first counter value as the second counter value is based at least in part on passage of the first time period.

10. The method of claim 9 wherein the second calibration loads the first counter value in the first counter as the second counter value in the second counter.

11. An apparatus comprising:

a first counter to increment a first counter value responsive to a first clock signal, the first clock signal having a first frequency and a second counter to increment a second counter value responsive to a second clock signal that is slower than, and asynchronous to, the first clock signal; and a sample circuit that determines a passage of a first time period since a previously selected time period, the first time period is a lowest common multiple of a first period associated with the first clock signal and a second period associated with the second clock signal, multiplied by K, where K is a number greater than or equal to one and performs a first calibration of the first and second clock signals, loads the first counter value as the second counter value in the second counter based at least in part on a phase relationship between the first clock signal and the second clock signal, the sample circuit further performs a second calibration based at least in part on whether an active edge of the second clock signal occurs between two active edges of the first clock signal.

12. The apparatus of claim 11 wherein the sample circuit further generates a sampling pulse based on a predetermined phase relationship, and obtains the first counter value responsive to the sampling pulse.

13. The apparatus of claim 11 further comprising a compare circuit that generates an error indicating a difference between the second counter value and a third counter value associated with the second counter.

14. The apparatus of claim 13 further comprising one or more increment values that adjust the second counter value over one or more cycles of the second clock signal.

15. The apparatus of claim 14 wherein the one or more increment values are increased for one or more cycles of the second clock signal responsive to the third counter value being less than the second counter value.

16. The apparatus of claim 15 wherein the one or more increment values are decreased for one or more cycles of the second clock signal responsive to the third counter value being greater than the second counter value.

17. The apparatus of claim 11 wherein the second counter value is corrected based on the second calibration.

18. The apparatus of claim 11 wherein the sample circuit increases the first counter value by a first average increment for a first number of cycles of the first clock signal, and increases the second counter value by a second average increment for a second number of cycles of the second clock signal.

19. The apparatus of claim 11 wherein the sample circuit loads the first counter value as the second counter value based at least in part on passage of the first time period.

20. The apparatus of claim 19 wherein the second calibration loads the first counter value in the first counter as the second counter value in the second counter.

* * * * *